(12) United States Patent
Noltemeyer et al.

(10) Patent No.: US 6,324,905 B2
(45) Date of Patent: *Dec. 4, 2001

(54) METHOD AND DEVICE FOR MEASURING AN ANGLE OF A ROTATABLE BODY

(75) Inventors: Ralf Noltemeyer, Wernau; Horst Fuhrmann, Grossbottwar, both of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/297,970
(22) PCT Filed: Mar. 6, 1998
(86) PCT No.: PCT/DE98/00661
§ 371 Date: Jun. 29, 1999
§ 102(e) Date: Jun. 29, 1999
(87) PCT Pub. No.: WO99/12796
PCT Pub. Date: Mar. 18, 1999

(30) Foreign Application Priority Data

Sep. 11, 1997 (DE) ............................................. 197 39 823

(51) Int. Cl.$^7$ ....................................................... G01B 7/30
(52) U.S. Cl. ........................................................ 73/207.25
(58) Field of Search ...................... 73/865.9; 324/207.25, 324/173, 174; 362/40, 43

(56) References Cited

U.S. PATENT DOCUMENTS 5,065,095   11/1991   Suzuki .
5,825,178  * 10/1998   Hipp et al. ...................... 324/207.25

FOREIGN PATENT DOCUMENTS 195 06 938   8/1996   (DE) .
196 01 657   7/1997   (DE) .

* cited by examiner

*Primary Examiner*—Robert Raevis
(74) *Attorney, Agent, or Firm*—Kenyon & Kenyon

(57) ABSTRACT

An apparatus (1) is described for determining the angle of a first rotatable body which coacts with two further rotatable bodies. The angle of the two further bodies can be measured, and the angle of the first body can be calculated therefrom. According to the present invention, means are provided with which simultaneous measurement of the angles of the two further bodies can be achieved. The accuracy of the determination of the angle of the first body is thereby improved.

4 Claims, 2 Drawing Sheets

METHOD AND DEVICE FOR MEASURING AN ANGLE OF A ROTATABLE BODY

FIELD OF THE INVENTION

The present invention relates to a method and an apparatus for measuring the angle of a first rotatable body which coacts with two further rotatable bodies, the angle of the two further bodies being measured and the angle of the first body being determined therefrom.

BACKGROUND INFORMATION

A conventional method and apparatus are described in German Patent Application No. 195 06 938, in which a first gear which is equipped with a number of teeth and is rotatably through more than 360° is provided as the first rotatable body. The two further rotatable bodies are also gears, which are in engagement with the first gear and whose numbers of teeth is less than the number for the first gear. In addition, the numbers of teeth of the two further bodies differ, for example, by one tooth.

Associated with each of the two further bodies is a sensor with which the angle of the body can be measured absolutely, i.e. even when the body is stationary. The angle of the first body can be determined from the measured angles of the two further bodies.

The accuracy of the angle determined for the first body can be influenced by an appropriate selection of the number of teeth of the first body and of the two further bodies. It has been found, however, that even after optimization in this regard, the angle determined for the first body still exhibits inaccuracies.

SUMMARY OF THE INVENTION

Proceeding therefrom, it is the object of the present invention to develop a method and an apparatus of the kind cited initially in such a way that exact determination of the angle of the first rotatable body is possible.

This object is achieved according to the present invention in that the angle of the two further bodies is measured simultaneously.

Simultaneous measurement ensures that even when the angles of the two further bodies are measured during rotation of the bodies, an exact determination of the angle of the first body is possible. If the angles of the two further bodies were not measured simultaneously, the result, especially in the event of rotation of the bodies, could be that the body measured later would already have rotated further by a slight "delta." This delta is in itself very small, but can nevertheless means that the requisite accuracy can no longer be obtained in the subsequent determination of the angle of the first body. This is reliably avoided by simultaneous measurement of the angles of the two further bodies. Measurement of the angles of the two further bodies is thus synchronized, with the substantial advantage that the accuracy of the determination of the angle of the first body is thereby improved.

Because of the synchronization, the angles of the two other bodies are measured at a single sampling time, i.e. simultaneously. Synchronization and definition of the single sampling time, and thus simultaneous measurement, are achieved with the aid of a signal with which measurement of the two angles is started.

In one embodiment of the present invention, the measured angles of the two further bodies are stored. The result of this is that determination of the angle of the first rotatable body is independent of measurement of the angles of the two further bodies. It is thus unnecessary to process the measured angles of the two further bodies immediately; rather it is possible, because the measured angles are stored, to process these measured angles regardless of the time at which measurement occurred.

It is also advantageous if each of the two further bodies is equipped with a magnet, associated with which is an AMR sensor that is provided for measuring the angle of the associated further body; and if an analysis circuit is provided which is coupled to the two AMR sensors and is provided for analyzing and optionally for transforming the measured angles of the two further bodies. The AMR sensors are suitable for making an absolute measurement of the angles of the two further bodies. The angles can thus be measures with no need to impart any rotation to the two bodies. The analysis circuit associated with the two AMR sensors is provided in order to process the measured angles further in a first step. In particular, it is possible for the analysis circuit to transform the measured angles, for example, into pulse-length modulated signals or other digital signals.

In another embodiment of the present invention, the analysis circuit is equipped with an arrangement, in particular with sample-and-hold elements, for storing the measured angles of the two further bodies. The above-described decoupling of the measurement of the angles of the two further bodies from the determination of the angle of the first body is thereby accomplished in simple manner.

It is particularly useful if a calculation device, in particular a programmable microprocessor, is provided for determining the angle of the first body. This makes it possible, in a simple manner, to adapt the determination of the angle of the first body, for example, to the geometry of the two further bodies. All that is necessary in this context is to modify the corresponding values in the program of the microprocessor.

In another embodiment of the present invention, the calculation device can generate a start signal with which simultaneous measurement of the angles of the two further bodies by the two AMR sensors can be triggered. The calculation device is thus responsible for the simultaneous measurement of the angles of the two further bodies. The calculation device triggers this simultaneous measurement by generating a single start signal which brings about measurements at both AMR sensors. This represents a reliable but nevertheless very simple possibility for achieving simultaneous measurement of the angles of the two further bodies.

The result of this common start signal is that the angles of the two further bodies are measured at a single sampling time, i.e. simultaneously. The single sampling time is defined by the start signal.

In another embodiment of the present invention, a line is provided with which the calculation device is connected to the analysis circuit, and on which the start signal can be delivered to the analysis circuit. The analysis circuit is acted upon by the start signal by way of this line.

Further features, potential applications, and advantages of the present invention are evident from the description below and from exemplary embodiments of the present invention which are depicted in the drawings. In this context, all features described or depicted constitute, of themselves or in any combination, the subject matter of the present invention.

DETAILED DESCRIPTION

Figure 1:
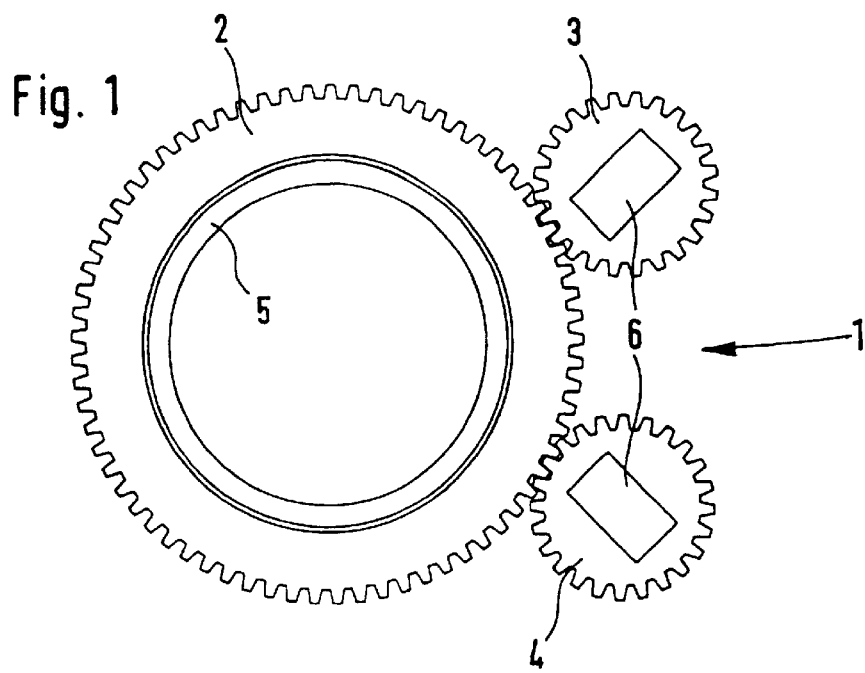
FIG. 1 shows a schematic diagram of an exemplary embodiment of an apparatus according to the present invention for determining an angle of a first rotatable body.

FIG. 1 depicts an apparatus 1 which has a first rotatable body and two further rotatable bodies. A gear 2 having a number of teeth n is provided as the first rotatable body. The two further rotatable bodies are also configured as gears 3, 4, gear 3 having a number of teeth m, and gear 4 a number of teeth m+1.

Gear 2 is, for example, coupled to a steering wheel of a motor vehicle. In particular, gear 2 is mounted on a shaft 5 which constitutes a component of the steering wheel.

Each of the two gears 3, 4 is equipped with a magnet 6, each of magnets 6 generating a magnetic field oriented in a specific direction.

The two gears 3, 4 and gear 2 are in engagement, so that a rotation of gear 2 causes corresponding rotations of gears 3, 4. Because of the different numbers of teeth on gears 2, 3, 4, the rotation angles of gears 2, 3, 4 upon rotation are different.

The rotation angle of gear 2 can be less than 360°. Especially when apparatus 1 is used for a steering wheel of a motor vehicle, gear 2 can perform multiple rotations. In particular, the rotation angle of gear 2 is, for example, 1440°. The rotation angles of the two gears 3, 4 are preferably not limited.

Figure 2:
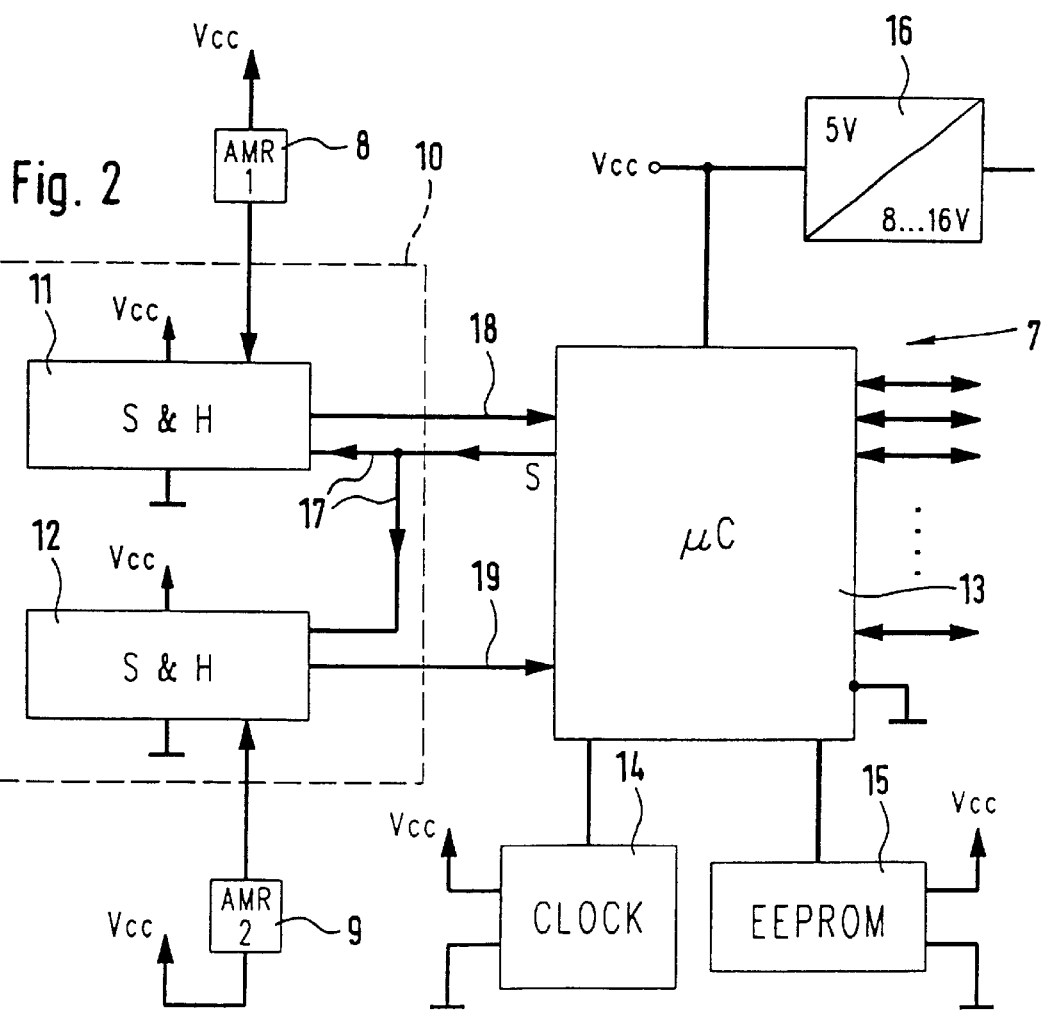
FIG. 2 shows a schematic block diagram of an electrical circuit for the apparatus illustrated in FIG. 1.

FIG. 2 depicts a circuit 7 which is associated with apparatus 1 illustrated FIG. 1. Circuit 7 shown in FIG. 2 has two so-called AMR sensors 8, 9, which are elements having a variable resistance (AMR =anisotropic magnetic resistance). AMR sensors are sensors 8, 9 whose resistance changes depending on how the sensor is oriented in an external magnetic field. AMR sensors are therefore suitable for sensing the rotation angles of bodies on which, for example, a magnet is mounted. The two AMR sensors 8, 9 are connected to an analysis circuit 10 which is made up of two blocks 11, 12; first AMR sensor 8 acts on block 11, and second AMR sensor 9 on block 12. Analysis circuit 10 is connected to a calculation device 13, in particular to a microprocessor. A clock 14 and a memory 15 are connected to calculation device 13. A power supply 16 generates a supply voltage $V_{cc}$ which is supplied to calculation device 13, clock 14, memory 15, the two blocks 11, 12 of analysis circuit 10, and to the two AMR sensors 8, 9. When the circuit is used in a motor vehicle, the supply voltage $V_{cc}$ is generated from the battery voltage of the motor vehicle.

The calculation device is connected to other devices via a plurality of further lines. When circuit 7 is used in a motor vehicle, calculation device 13 is connected by way of the these lines, e.g., to a control device for controlling and/or regulating the functions of the motor vehicle.

The two AMR sensors 8, 9 are associated with the two magnets 6 of the two gears 3, 4. Each of magnets 6 generates in the associated stationary AMR sensor 8, 9 a voltage which depends on the angle of the associated gear 3, 4. Rotation of the respective gear 3, 4 causes a voltage profile which rises over an angle of approximately 180°, and then declines again over an angle of approximately 180°. After one revolution of gear 3, 4, i.e. after 360°, this voltage profile repeats.

Figure 3:
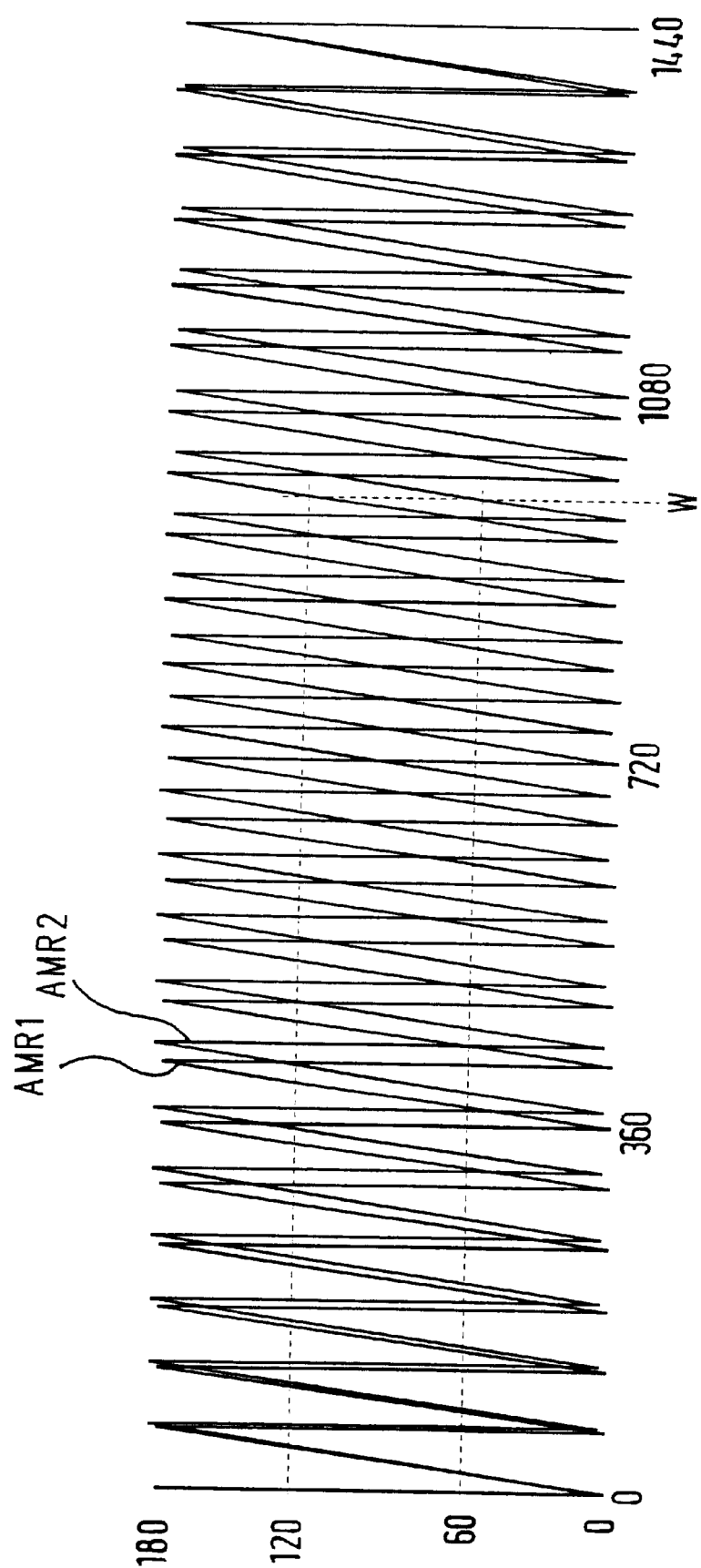
FIG. 3 shows a schematic diagram of two signals occurring in the electrical circuit illustrated in FIG. 2.

FIG. 3 depicts the voltage profile generated by the two AMR sensors 8, 9 when gears 3, 4 rotate. The rotation of gear 2, which extends over a range from 0 to 1440°, is plotted on the horizontal axis. A rotation of this kind of gear 2 brings about a plurality of rotations of gears 3, 4. This plurality of rotations of gears 3, 4 in turn causes the voltages generated by the AMR sensors 8, 9 to change. This is plotted in the diagram shown in FIG. 3. A rise in the voltage profile means a 180-degree rotation of the associated gear 3, 4.

Because of the differing numbers of teeth on gears 3, 4, different voltage profiles occur for the two AMR sensors 8, 9.

As depicted in FIG. 3, the voltage for the two AMR sensors 8, 9 when gear 2 is at an angle of 0° is also 0°. When gear 2 then rotates, the voltage of the two AMR sensors 8, 9 rises. Because of the differing numbers of teeth on the two gears 3, 4, this rise occurs with differing slopes. The consequence is that the two voltage profiles generated by AMR sensors 8, 9 are not identical. This is illustrated in FIG. 3 in particular at somewhat greater angles for gear 2, at which the two voltage profiles of AMR sensors 8, 9 differ substantially from one another.

When apparatus 1 and circuit 7 are in operation, the voltage of the two AMR sensors 8, 9 is measured. This voltage is equivalent to the angles of the two gears 3, 4.

From these two measured angles of gears 3 and 4, and in particular from the difference between the two above-described angles, conclusions can be drawn as to the angle of gear 2. This calculation of the angle of gear 2 involves the numbers n, m, and m+1 for gears 2, 3, and 4. The correlation described above is plotted in FIG. 3, as an example, for an angle W.

As shown in FIG. 2, a line 17 is provided which connects calculation device 13 to each of the two blocks 11, 12 and thus to analysis circuit 10. On line 17 it is possible to deliver, to analysis circuit 10 and in particular to the two blocks 11, 12, a start signal S with which simultaneous measurement of the angles of the two gears 3, 4, can be achieved. These simultaneously measured angles of the two gears 3, 4 are then stored.

For this purpose, the two blocks 11, 12 each contain, in particular, a sample-and-hold element which is connected to the respectively associated AMR sensor 8, 9. The sample-and-hold element is also acted upon by start signal S.

When calculation device 13 then generates start signal S, for example by transferring on line 17 a binary signal from a "low" to a "high" potential, the result is that the two sample-and-hold elements in the two blocks 11, 12 simultaneously read in and store the voltages supplied by the two AMR sensors 8, 9. This means that the angles measured by the two AMR sensors for the two gears 3, 4 are stored synchronously in the sample-and-hold elements.

It is possible thereafter for the calculation device, with the aid of further activation signals, to read the stored angles of the two gears 3, 4 out of the sample-and-hold elements of the two blocks 11, 12, and read them via corresponding lines 18, 19 into calculation device 13 for further processing.

Start signal S present on line 17 thus results in a synchronization of the two blocks 11, 12, and thus ultimately in a synchronization of the measurement of the angles of the two gears 3, 4. This ensures an identical time reference for the measurement of the angles of the two gears 3, 4. The consequence is that because of such identical time reference, a higher accuracy can be achieved in the subsequent calculation of the angle of gear 2.

The identical time reference for measuring the angles of the two gears 3 and 4 is achieved with the aid of start signal S. The sampling time, and thus the identical time reference, for the measure of the angles is defined by way of the transition, as described above, in start signal S from a lower to a higher potential. On the basis of start signal S, a common time reference is created which results in a synchronization of the measurement of the two angles and thus in a simultaneous measurement, i.e. a measurement of the two context, for the sampling time to be identical to a time generated by clock 14.

What is claimed is:

1. An apparatus for determining a first rotating angle of a first rotatable body, the first rotatable body cooperating with a second rotatable body and a third rotatable body, the apparatus comprising:

a first arrangement measuring a second rotating angle of the second rotatable body;

a second arrangement measuring a third rotating angle of the third rotatable body, wherein the second and third rotating angles are measured simultaneously; and a third arrangement determining the first rotating angle of the first rotatable body as a function of the second and third rotating angles, the third arrangement including a calculation device which determines the first rotating angle;

wherein the first arrangement includes a first AMR sensor for measuring the second rotating angle, and the second arrangement includes a second AMR sensor for measuring the third rotating angle; and wherein the calculation device is capable of generating a start signal for triggering a simultaneous measurement of the second and third rotating angles by the first and second AMR sensors.

2. The apparatus according to claim 1, wherein the first and second AMR sensors measure the second and third rotating angles using the start signal at a common time reference.

3. The apparatus according to claim 2, wherein the common time reference is a single sampling time.

4. The apparatus according to claim 1, wherein the third arrangement includes an analysis circuit;

wherein the calculation device is connected to the analysis circuit via a line; and wherein the analysis circuit receives the start signal via the line.

* * * * *